(12) United States Patent
Rao et al.

(10) Patent No.: US 8,355,685 B2
(45) Date of Patent: *Jan. 15, 2013

(54) SEGMENTED CDMA SEARCHING

(75) Inventors: Subramanya P. Rao, Santa Clara, CA (US); Da-Shan Shiu, Taipei (TW); Jeremy H. Lin, San Diego, CA (US); Jeong Geun Kim, Yongin (KR)

(73) Assignee: QUALCOMM Incorporated, San Diego, CA (US)

( * ) Notice: Subject to any disclaimer, the term of this patent is extended or adjusted under 35 U.S.C. 154(b) by 815 days.

This patent is subject to a terminal disclaimer.

(21) Appl. No.: 11/746,031

(22) Filed: May 8, 2007

(65) Prior Publication Data

US 2007/0298739 A1   Dec. 27, 2007

Related U.S. Application Data

(62) Division of application No. 10/053,398, filed on Jan. 17, 2002, now Pat. No. 7,215,935.

(51) Int. Cl.
*H04B 1/18* (2006.01)
*H04B 1/16* (2006.01)

(52) U.S. Cl. ............... 455/161.1; 455/183.1; 455/192.1

(58) Field of Classification Search ............... 455/161.1, 455/183.1, 192.1, 95, 575, 550.1, 280, 313, 455/334, 161.2, 183.2, 414.1, 186.1, 164.2; 375/150, 130, 142, 145, 147, 149; 370/209, 370/342, 335
See application file for complete search history.

(56) References Cited

U.S. PATENT DOCUMENTS

| | | | | |
|---|---|---|---|---|
| 5,414,730 A | * | 5/1995 | Lundquist et al. | 375/150 |
| 5,726,982 A | | 3/1998 | Witter | |
| 5,867,527 A | * | 2/1999 | Ziv et al. | 375/147 |
| 5,953,320 A | * | 9/1999 | Williamson et al. | 370/252 |
| 5,987,012 A | * | 11/1999 | Bruckert et al. | 370/331 |
| 6,157,631 A | * | 12/2000 | Rohani | 370/342 |
| 6,223,042 B1 | * | 4/2001 | Raffel | 455/455 |

(Continued)

FOREIGN PATENT DOCUMENTS

WO    WO0059123    10/2000

OTHER PUBLICATIONS

International Search Report—PCT/US2003/01565, International Search Authority—European Patent Office—May 8, 2003.

*Primary Examiner* — Dominic E Rego

(74) *Attorney, Agent, or Firm* — Stanton Braden

(57) ABSTRACT

Techniques for segmented CDMA searching are disclosed. In one aspect, a searcher comprises a plurality of storage elements selectable for performing a plurality of segmentable search tasks, each storage element operable for storage of and access to state information for one of the plurality of search tasks. In another aspect, a first search task is interrupted in progress, the state information for the first task is stored, a second search task is performed, and the first search task is continued using the stored state information. In yet another aspect, a search task is segmented into smaller search segments, sized to fit within contiguous available time in the searcher. Various other aspects of the invention are also presented. These aspects have the benefit of circuit area and search-time efficiency which translate into reduced costs, increased standby time, increased acquisition speed, higher quality signal transmission, increased data throughput, decreased power, and improved overall system capacity.

21 Claims, 8 Drawing Sheets

U.S. PATENT DOCUMENTS

| | | | |
|---|---|---|---|
| 6,452,961 B1 * | 9/2002 | Van Wechel | 375/142 |
| 6,580,746 B2 * | 6/2003 | Challa et al. | 375/130 |
| 6,650,694 B1 | 11/2003 | Brown et al. | |
| 6,700,922 B2 * | 3/2004 | Challa et al. | 375/147 |
| 6,792,031 B1 | 9/2004 | Sriram et al. | |
| 6,807,418 B2 * | 10/2004 | Bamburak et al. | 455/435.2 |
| 7,215,935 B2 | 5/2007 | Rao et al. | |
| 7,703,107 B2 * | 4/2010 | Chen et al. | 719/328 |
| 2001/0014116 A1 * | 8/2001 | Saito et al. | 375/148 |
| 2001/0046205 A1 * | 11/2001 | Easton et al. | 370/209 |
| 2001/0048714 A1 * | 12/2001 | Jha | 375/150 |
| 2001/0055328 A1 * | 12/2001 | Dowling | 375/130 |
| 2002/0018487 A1 * | 2/2002 | Chen et al. | 370/465 |
| 2002/0186751 A1 * | 12/2002 | Kimura et al. | 375/142 |
| 2002/0187804 A1 * | 12/2002 | Narasimha et al. | 455/552 |
| 2003/0012312 A1 * | 1/2003 | Gerhards et al. | 375/343 |

* cited by examiner

SEGMENTED CDMA SEARCHING

CLAIM OF PRIORITY UNDER 35 U.S.C. §120

The present Application for Patent is a divisional of and claims priority to co-pending patent application Ser. No. 10/053,398 entitled SEGMENTED CDMA SEARCHING filed Jan. 17, 2002, now allowed, and assigned to the assignee hereof and hereby expressly incorporated by reference herein.

FIELD

The present invention relates generally to communications, and more specifically to a novel and improved method and apparatus for segmented CDMA searching.

BACKGROUND

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Pseudorandom noise (PN) sequences are commonly used in CDMA systems for spreading transmitted data, including transmitted pilot signals. Inherent in the design of direct sequence CDMA systems is the requirement that a receiver must align its PN sequences to those of a base station. In some systems, such as IS-95 and cdma2000, base stations are differentiated by transmitting a common PN sequence with a unique offset. Other systems, such as those defined by the W-CDMA standard, differentiate base stations using a unique PN code for each. The process by which a mobile station acquires the pilot signals of neighboring base stations in known as searching.

A mobile station may be in communication with a network of base stations, some of which may be transmitting on different frequencies, and some of which may use alternate air interface schemes. An example may include a system using equipment conforming to one or more of the above named standards. In such a scenario, occasional searches across multiple frequencies and systems may be needed for the mobile station to keep track of the best quality cell. Tracking and communicating with the best quality cells can result in better signal transmission and reception, often at reduced transmission power levels by both the base station and the subscriber unit. This, in turn, increases the capacity of the CDMA system (either in terms of support for an increased number of users, or higher transmission rates, or both).

One method for supporting multi-frequency, multi-system search is to deploy multiple parallel searches to support the various frequencies and systems. This solution may prove costly in terms of the hardware required to support it.

Another solution is to time-share a single searcher, for use on a variety of frequencies and systems. One problem with this second solution is that an ongoing search can be interrupted by a new search request scheduled on a different frequency or system. Often this is handled by aborting the search in progress to make resources available for the new search. This is an inefficient use of the available resources. Another problem can arise when the search resources are only available for a limited time to search alternate frequencies and/or systems. In some cases, the limited time may not be sufficient to complete the alternate search. There is therefore a need in the art for a searcher that can perform segments of one or more search tasks, ultimately combining the results to generate one or more completed search tasks.

SUMMARY

Embodiments disclosed herein address the need for segmented CDMA searching. In one aspect, a searcher comprises a plurality of storage elements selectable for performing a plurality of segmentable search tasks, each storage element operable for storage of and access to state information for one of the plurality of search tasks. In another aspect, a first search task is interrupted in progress, the state information for the first task is stored, a second search task is performed, and the first search task is continued using the stored state information. In yet another aspect, a search task is segmented into smaller search segments, sized to fit within contiguous available time in the searcher. Various other aspects of the invention are also presented. These aspects have the benefit of circuit area and search-time efficiency which translate into reduced costs, increased standby time, increased acquisition speed, higher quality signal transmission, increased data throughput, decreased power, and improved overall system capacity.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
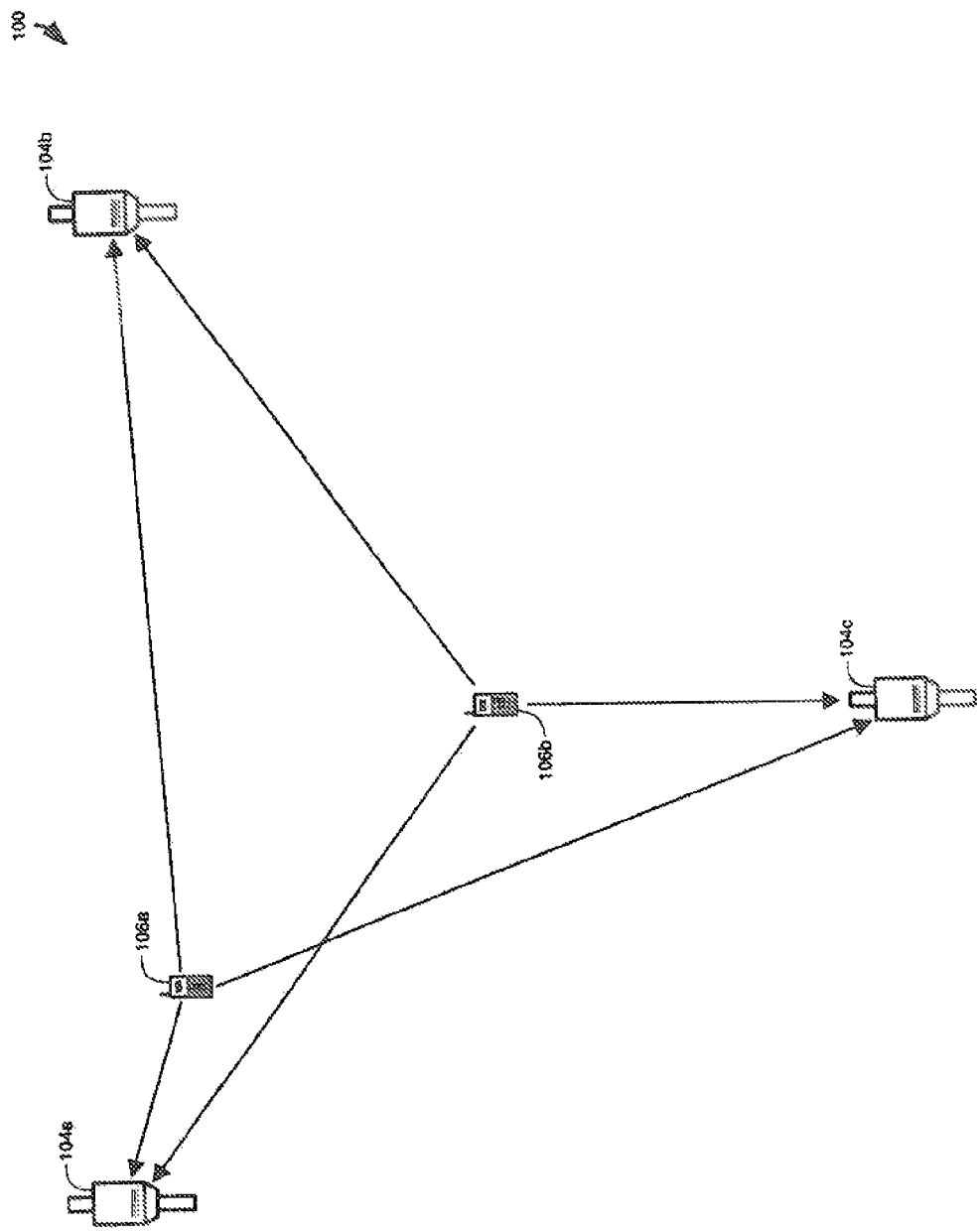
FIG. 1 is a general block diagram of a wireless communication system capable of supporting a number of users.

FIG. 1 is a diagram of a wireless communication system 100 that supports a number of users, and which can implement various aspects of the invention. System 100 may be designed to support one or more CDMA standards and/or designs (e.g., the W-CDMA standard, the IS-95 standard, the cdma2000 standard, the HDR specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention will assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
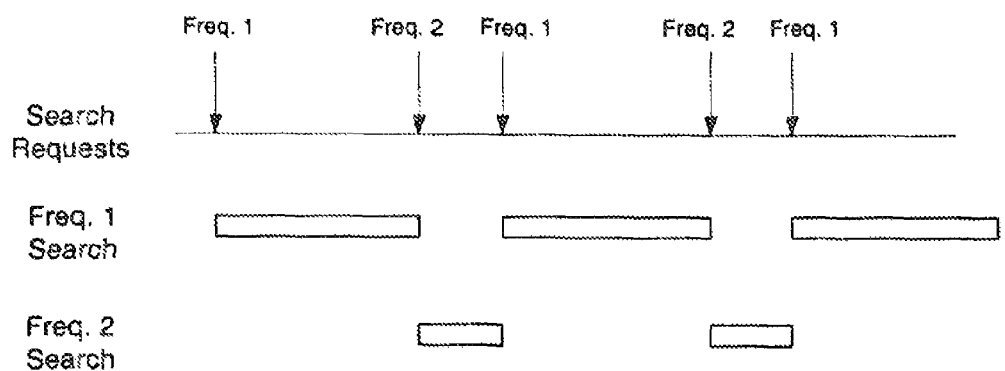
FIG. 2 depicts the allocation of searcher time, distributed between two search tasks.

FIG. 2 depicts the relationship between scheduled searches on various frequencies. In the example shown, only two frequencies are searched, although any number frequencies, system types, or the combination thereof can be supported within the scope of the present invention. The line labeled "Search Requests" has various arrows, corresponding to search requests for frequency 1 or frequency 2 searches. Below the Search Requests line are bars graphically representing the time a searcher has available to search on frequency 1 or frequency 2, labeled "Frequency 1 Search" and "Frequency 2 Search", respectively.

In this example, the time allotted for frequency 2 search is considerably shorter than the time allotted to frequency 1 search. When a mobile station is tuned to and communicating on one frequency, yet needs to monitor an alternate frequency, it is common to dedicate more time to searching on the frequency the mobile station is communicating on, and less time for tuning to and searching on the alternate frequency. As stated above, it may be that a search in progress on frequency 1 is not finished when the frequency 2 search request comes in. In prior architectures, one solution was to simply discard the intermediate results, start the frequency 2 search, and thus lower the effective utilization of the searcher, as well as degrade overall system performance whenever the aborted search results in using less than optimal signal paths for demodulation.

In embodiments of the present invention, examples of which are detailed below, the frequency 1 search can be interrupted, then restored once the frequency 2 search is completed. Another potential problem could arise if the time allotted for frequency 2 search was not sufficient to tune to that frequency and complete the search task on that frequency. The frequency 1 request would then come and the frequency 2 results would be discarded, or the frequency 1 search would have to be postponed. In the embodiments described below, the frequency 2 search can be interrupted, and restored during the next frequency 2 allotment. Furthermore, if the time allotment for a frequency is known in advance, the search tasks for that frequency can be partitioned to fit within it.

Figure 3:
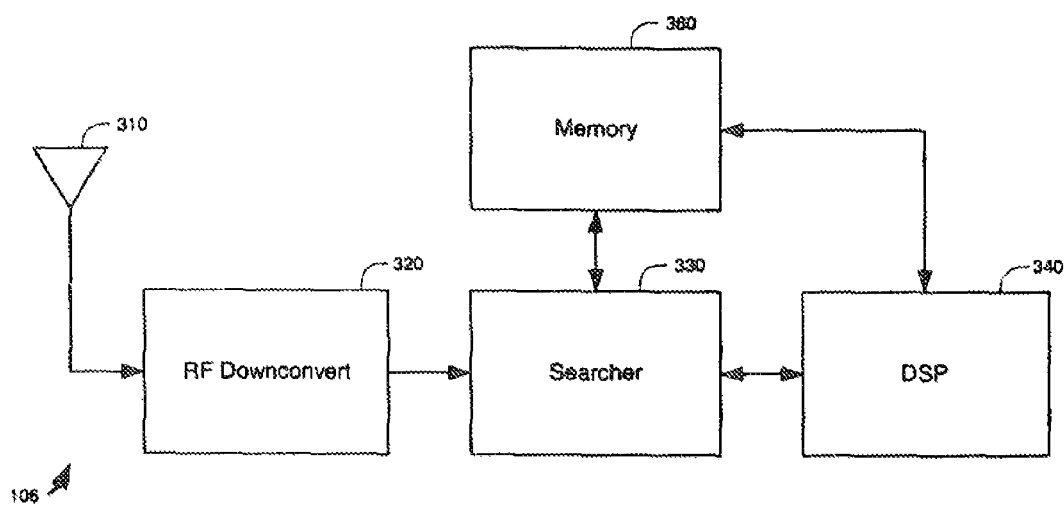
FIG. 3 depicts an embodiment of a mobile station for performing segmented CDMA searching.

FIG. 3 depicts an embodiment of mobile station 106. For clarity, only a subset of the components of a mobile station are shown. Signals are received at antenna 310, and delivered to RF downconvert block 320 for amplification, downconversion, and sampling. Various techniques for downconverting CDMA signals to baseband are known in the art. RF downconvert block 320 may be configurable to receive various frequencies. From RF downconvert block 320, I and Q samples are delivered to searcher 330. Note that in alternative embodiments, I and Q samples may be stored in a memory prior to delivery to searcher 330 (details not shown). Searcher 330 is in communication with a digital signal processor (DSP) 340. Alternatives to employing a DSP include using another type of general purpose processor, or specialized hardware designed to carry out various tasks related to searching that might be employed in the DSP. Depending on the capabilities of searcher 330, DSP 340 may carry out various tasks described in the embodiments below, and coordinate the performance of the remaining tasks in searcher 330. Searcher 330 can search the results of any of the frequencies tuned in RF downconvert block 320. While only searcher 330 is shown in FIG. 3, any number of searchers can be implemented in parallel in accordance with principles of the present invention. Intermediate values may be computed at any point in the processes and apparatuses described below in searcher 330 for delivery to DSP 340 for subsequent processing. DSP 340 may return processed intermediate values to searcher 330 for subsequent processing as well. Various alternative configurations of DSP/dedicated hardware will be clear to those of skill in the art and fall within the scope of the present invention.

Memory 360 is sown connected to DSP 340. Memory 360 is used in various embodiments for storing partial results and state for one or more search processes in progress, as will be discussed in detail below. Memory 360 is shown separately for discussion purposes only, it may be embedded in DSP 340, or alternatively may be embedded in searcher 330. In one embodiment, DSP 340 retrieves data from searcher 330 for storing in memory 360, and retrieves data from memory 360 for replacing in searcher 330. In an alternate embodiment, shown by the alternate connection between searcher 330 and memory 360, data can be directly stored in memory 360 from searcher 330, and vise versa. Memory 360 may comprise one memory element, or may be made up of several memory elements. Memory 360 can be any storage medium known in the art, including but not limited to RAM, registers, magnetic media, and the like.

In addition to storing state information and partial results for searcher 330, memory 360 can be used to hold programming instruction for DSP 340. These instruction can include those required to carry out method embodiments of the present invention, detailed more fully below. In an alternate embodiment, in which memory 360 is embedded within searcher 330, an instruction memory (not shown) other than memory 360 may be connected to DSP 340 for carrying out methods as described herein.

Figure 4:
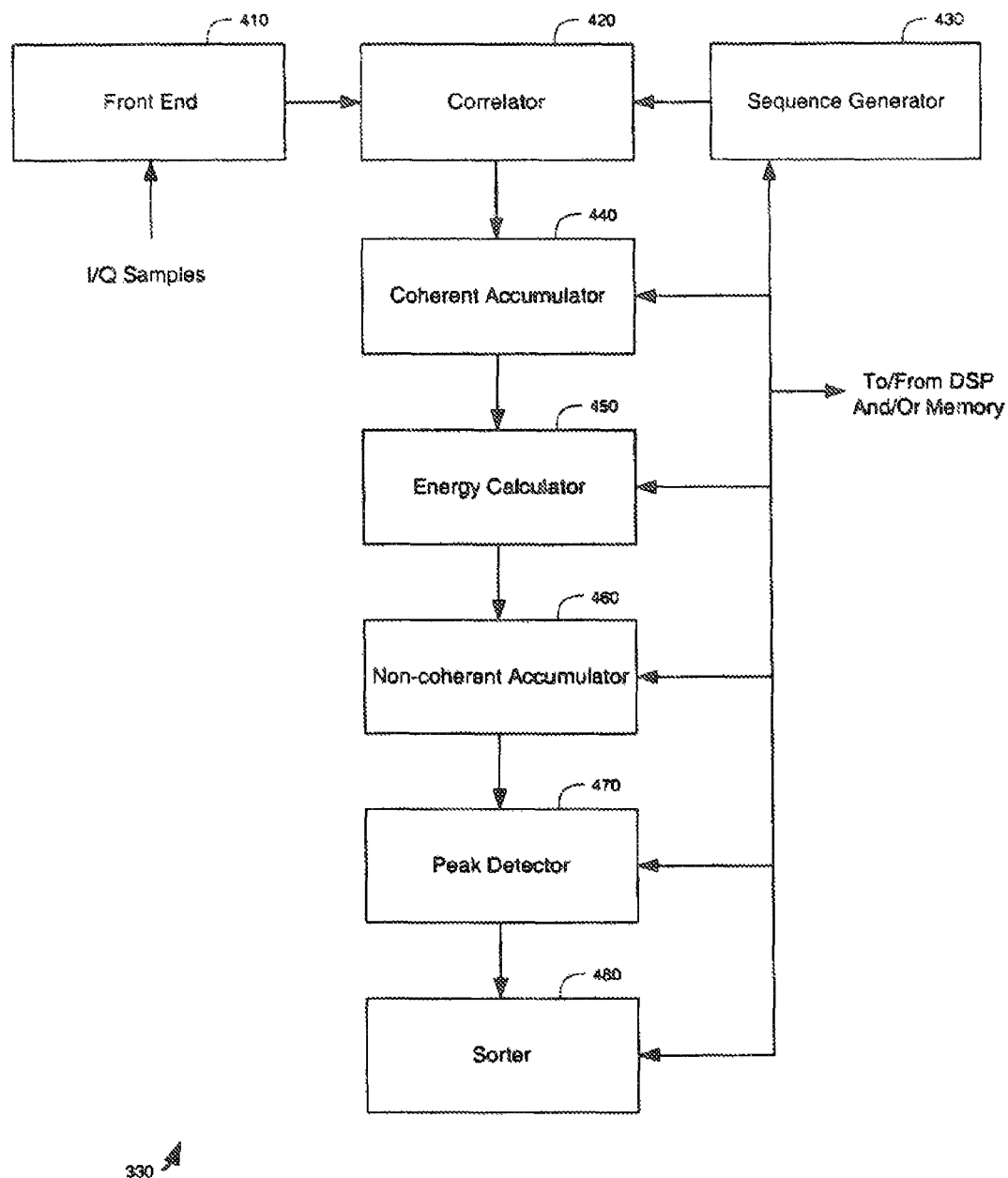
FIG. 4 depicts an embodiment of a searcher, operable with a plurality of storage elements.

FIG. 4 depicts an embodiment of searcher 330, which can be configured to support searching in a variety of CDMA systems, such as those described above. I and Q samples are delivered to optional front end 410 for functions such as code Doppler adjustment, decimation, rotation and the like. In alternate embodiments, a front end may not need to be deployed in searcher 330.

I and Q samples are delivered from front end 410 (if one is deployed) to correlator 420, where correlation with a sequence delivered from sequence generator 430 takes place. Correlator 420 can be configured to produce a partial coherent accumulation of a number of chips for each hypothesis being tested. It can also be configured for time-sharing such that ore than one hypothesis can be tested in each chip time. Such a correlator can be described as a multi-slice correlator, with each of a plurality of slices operating to correlate each of a plurality of unrelated hypothesis streams.

The partial coherent accumulations for each hypothesis being tested in correlator 420 are delivered to coherent accumulator 440, where they are accumulated for a coherent accumulation interval. The coherent accumulation interval can be different for each hypothesis being tested. Coherent accumulator 440 contains storage for partial accumulations corresponding to the plurality of hypothesis currently being tested.

The resultant coherent accumulations are delivered from coherent accumulator 440 for energy calculation in energy calculator 450. A typical energy calculator may perform an $I^2+Q^2$ function on the I and Q portions of the coherent accumulation to produce an energy value. The energy values are delivered to non-coherent accumulator 460 for non-coherent accumulation for each of the hypotheses being tested. Non-coherent accumulation proceeds for a duration specified by the non-coherent accumulation interval, M. A unique M can be programmed for each hypothesis being tested. Non-coherent accumulator 460 contains storage for partial accumulations corresponding to the plurality of hypotheses currently being tested.

The non-coherent accumulator produces accumulated energy values for each hypothesis. The energy values can be delivered to DSP 330, or another destination, or searcher 330 may be configured with a searcher backend comprising peak detector 470 and sorter 480. If so configured, the energy values are delivered to peak detector 470. Peak detector 470 can be configured to detect peaks within a plurality of streams of hypothesis energies, or as a single peak detector.

The output of peak detector 470 is delivered for sorting in sorter 480. Sorter 480 can comprise a plurality of sorting elements to correspond with the plurality of peak detector elements in peak detector 470. This continues to allow for multiple independent search tasks to be performed, as described above. Sorter 480 can be further configured such that the plurality of sorting elements can be used within a single sorting element. A single sorting element is convenient when peak detector 470 is configured as a single peak detector.

In one embodiment, blocks 430-480 are in communication with a DSP, such as DSP 340. The various blocks may receive configuration settings, or various control signals, from DSP 340 to perform search tasks, a few examples of which follow. The sequence generator 430 may be configurable to select between a variety of sequences, for example. Accumulation lengths can be programmed in coherent accumulator 440 and non-coherent accumulator 460. As described, the peak detector 470 and sorter 480 may be configurable to perform peak detection and sorting on a single stream of energies, or to generate a plurality of results for a plurality of streams of energies. Front end 410 and correlator 420 may also receive control information from DSP 340 (connections not shown).

In one embodiment of the present invention, the connections between the various blocks of FIG. 4 and DSP 340 are used for delivering intermediate results and state information to the DSP, as well as restoring those results and states from the DSP. This facilitates the interruption of a search process and the subsequent restoration of that search process. This interconnection also allows for an alternate search process to be initialized (or restored) and processed in searcher 330 while the first search process is in a state of interruption. The state of the searcher for each in-progress search process, and any required intermediate results, can be stored in memory in DSP 340, or connected thereto.

In an alternate embodiment, the searcher back end, comprising peak detector 470 and sorter 480, can be bypassed when switching to an alternate search task. The results of the alternate search tasks can be delivered from non-coherent accumulator 460 to a destination, such as DSP 340. The back end can remain in the state required for re-initialization of the interrupted search task.

The role of searcher 330 is to resolve uncertainty about which scrambling code is being transmitted from the various neighboring base stations, and at what offset from an internal time reference it is being transmitted. The sequence generator 430 is configured to generate the sequence corresponding to the scrambling code, at a certain offset, and the correlation, at metric of similarity, between the input samples and the generated sequence is calculated for each hypothesis offset and code. A property of the scrambling code sequences selected is that the auto-correlation with zero offset has a significantly higher value than the autocorrelation at any other offset, or than the cross-correlation of the scrambling code sequence with any other scrambling code sequence. Thus, the searcher 330 can find the scrambling code identification and the offset relative to an internal reference by performing correlation over the possible search space (the number of unique codes and the number of offsets therein), and selecting the hypothesis with the highest similarity metric.

Considering the search space that spans all possible scrambling codes and their hypothetical starting positions, or offsets, a single task assigned to the searcher can be represented by $<s(i), p(k)>$, where $s(i)$ denotes the $i^{th}$ scrambling code and $p(k)$ denotes the $k^{th}$ hypothetical position. The output of the non-coherent accumulator 460 can be given by Equation 1:

$$E(p(k)) = \sum_{m=0}^{M-1} \left| \sum_{n=0}^{N-1} r(k+n+mN) \cdot s(i, n+mN) \right|^2 \quad \text{Equation 1}$$

where
  $E(p(k))$ is the energy for the hypothesis at position k;
  $r(k)$ is the $k^{th}$ input sample;

s(i,k) is the $k^{th}$ symbol of the sequence of scrambling code 1;

N is the length of coherent accumulation; and

M is the length of non-coherent accumulation.

As seen in Equation 1, the computation is sequential in time. Let (n,m) denote the computation index, where n and m are the intermediate counts of the coherent and non-coherent accumulation intervals, respectively. Then for a particular search task <s(i), p(k)>, the computation will progress as follows:

(0,0), (1,0) . . . , (N−1,0), (0,1), (1,1) . . . , (N−1,1), . . . , (N−1, M−1).

An important observation is that the state of the searcher is specified by the index (n, m). Thus, if there is a need to suspend the search in progress, the current state and the intermediate results can be saved and used later to configure the searcher 330 to continue the previously interrupted search task. Storage can be deployed sufficient to store any number of interrupted search tasks.

Figure 5:
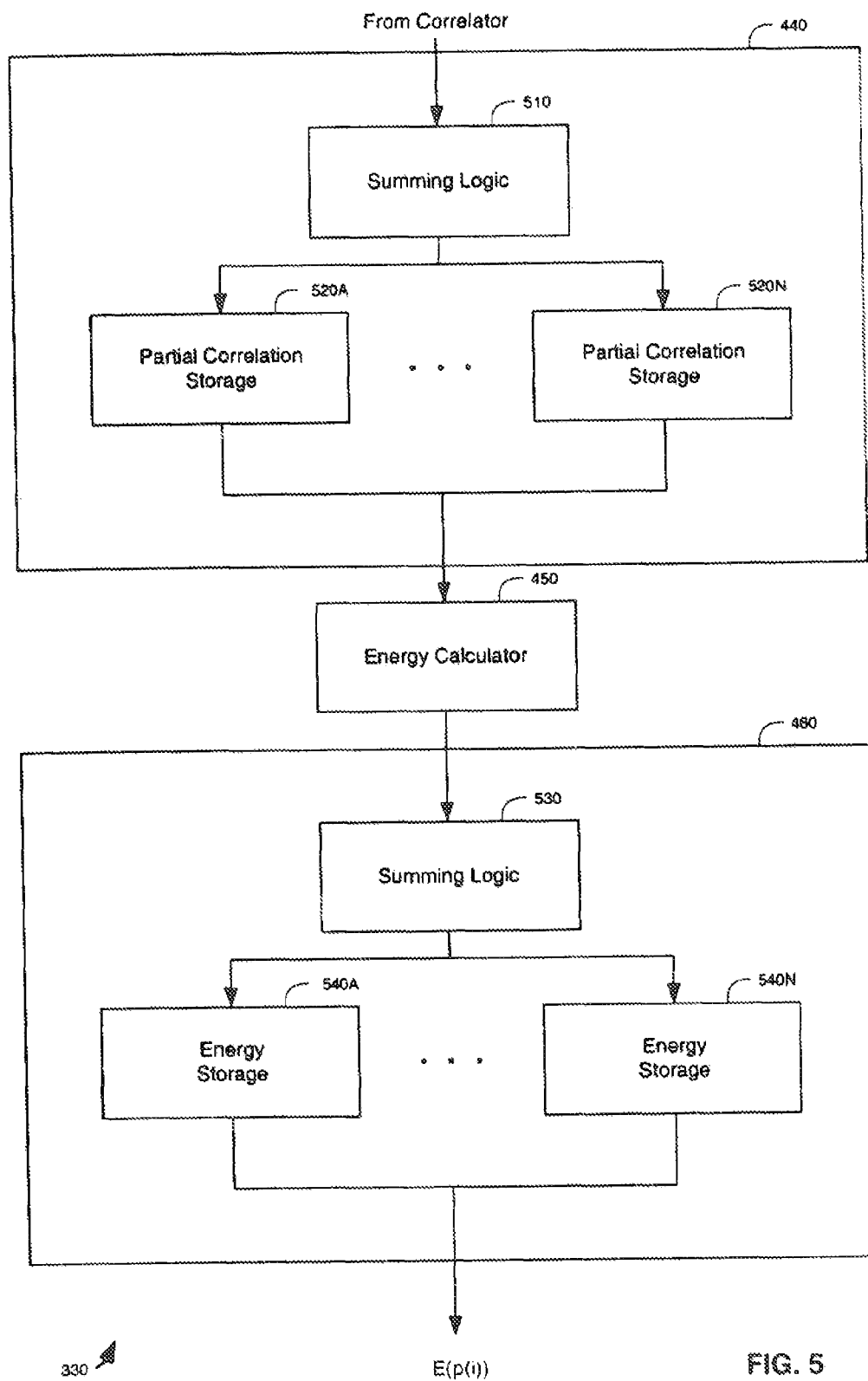
FIG. 5 depicts an alternate embodiment of a searcher, configured with a bank of storage elements for segmented CDMA searching.

FIG. 5 depicts a portion of an alternate embodiment of searcher 330. In this embodiment, storage is deployed among the various blocks such that the state and intermediate results for a plurality of search tasks can be stored within searcher 330. This allows for switching between search tasks without delivering results and state to the DSP for storage, and without restoration from the DSP to reinitiate a search task. Rather, when a first search task is interrupted, the intermediate results are left in place in state corresponding to the first search task, and the next search task proceeds using a separate storage. In FIG. 5, the results of correlator 420 are delivered to coherent accumulator 440. Coherent accumulator 440, in this embodiment, comprises summing logic 510 and N partial correlation storages 520A-520N, where N corresponds to the number of concurrent search tasks supported by the embodiment. During a search process, corresponding to one of processes A through N, the corresponding storage is selected for accumulation in summing logic 510 with the incoming result from the correlator 420. The corresponding storage is also selected to deliver coherent accumulation results to energy calculator 450, where energy is calculated as described above.

The energies are delivered to non-coherent accumulator 460. Non-coherent accumulator 460, in this embodiment, comprises summing logic 530 and N partial correlation storages 540A-540N. During a search process, corresponding to one of processes A through N, the corresponding storage is selected for accumulation in summing logic 530 with the incoming result from the energy calculator 450. The corresponding storage is also selected to deliver non-coherent accumulation results, labeled E(p(i)), as defined above in Equation 1.

To return to any of the save search processes, A through N, the appropriate storage banks 520 and 540 are selected to restore the state of the desired search process, and searching is resumed.

In an alternative embodiment, the storage banks 520A through 520N used for coherent accumulation can be omitted. Instead of storing the partial values for the coherent accumulation the partial results can be delivered to energy calculator 450 for energy calculations, and the energies delivered for non-coherent accumulation in non-coherent accumulator 460, configured as just described. This configuration is useful when the time interval between search tasks is greater than the coherence interval of the associated search paths. If the coherence interval has been exceeded by the time a search task is restored, it is not appropriate to coherently combine the partial result stored earlier with the new partial coherent accumulation values. The earlier stored partial results need not be discarded, however, as they can be non-coherently combined using their associated energy values. This same approach can be applied to an embodiment as described in FIG. 4. The resultant storage in the DSP 340, or connected thereto, can be reduced with the storage for coherent accumulations is eliminated.

It should be noted that the various storage banks described herein are denoted as separate storage entities. As will be appreciated by those of skill in the art, the storage elements need not reside physically in distinct memory elements. The various banks of the coherent accumulator or non-coherent accumulator may reside in a single memory. Furthermore, the banks for all the blocks may reside in a single memory, with multiple ports as necessary to support the throughput requirements (or alternately using multi-packing techniques, known in the art). In these embodiments, the conceptual notions of the independent banks can be thought of as the multiplexing and memory addressing components required to maintain a logical separate bank within a common memory. (Details not shown).

Following the approach described above with respect to FIG. 5, FIG. 6 depicts an embodiment of peak detector 470. Rather than storing and restoring state and intermediate results in DSP 340, or the storage connected thereto, state storage A through state storage N are connected to detection logic 610. The state variables and storage required for each search task are stored in a corresponding state storage 620. Detection logic 610 interacts with the selected state storage to perform peak detection for the selected search process, delivering detected peaks for that process as a result. The detected peaks may be delivered to a sorter 480, if one is deployed. Each peak detector can be configured for single peak detecting, or for detecting a plurality of peaks from a plurality of energy streams, as described above.

Figure 6:
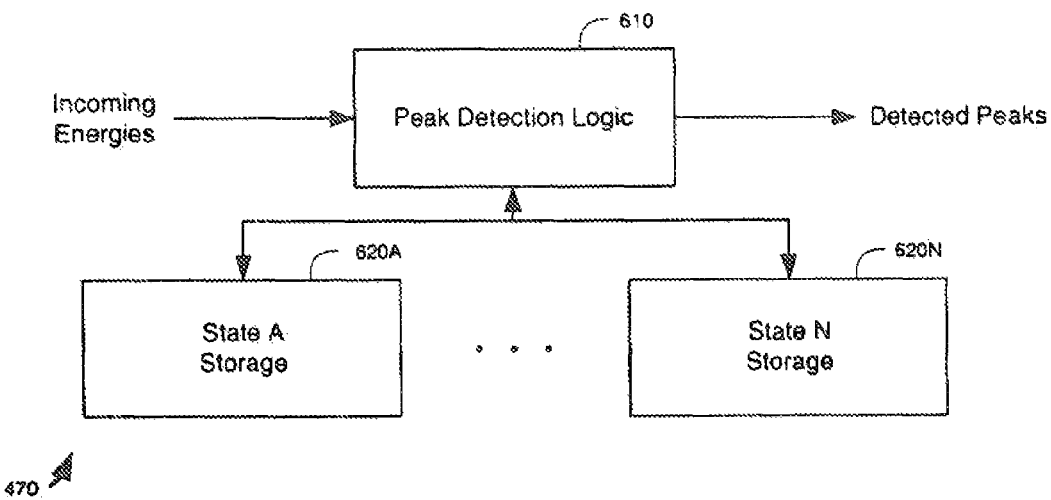
FIG. 6 depicts an embodiment of a peak detector, configured in accordance with the principles of the present invention.
Figure 7:
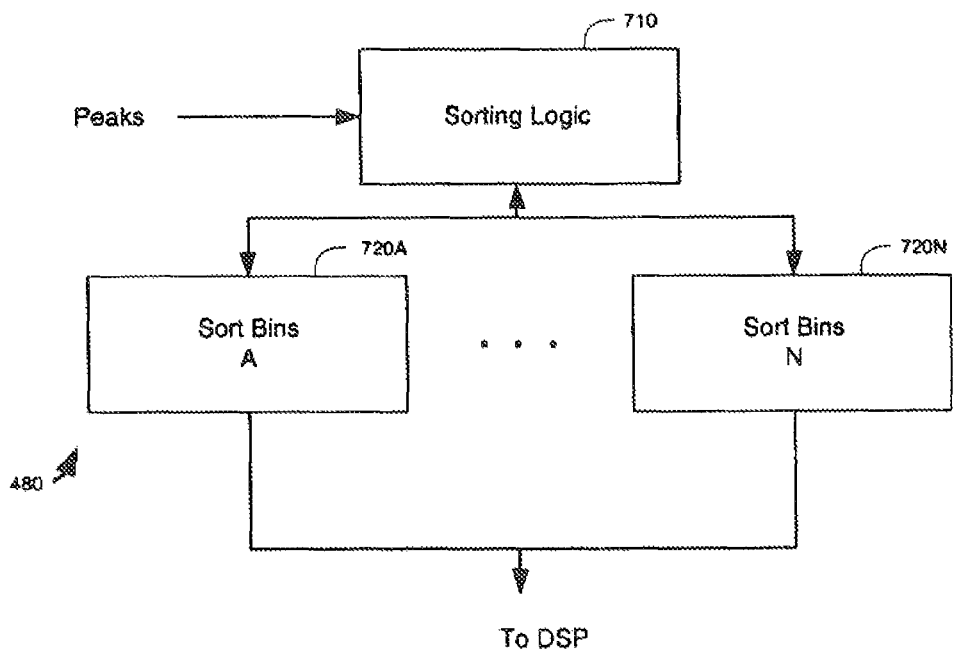
FIG. 7 depicts an embodiment of a sorter, configured in accordance with the principles of the present invention.

FIG. 7 depicts an embodiment of sorter 480, configured for use in similar fashion to FIGS. 5 and 6. Sort bins A through N, 720A-720N, respectively, are selected for use with sorting logic 710, according to the search task currently in progress. Sort bins A through N, 720A-720N, are used for storing state and partial results for the various sorting tasks. One sort bin 720 is selected at a time, corresponding to the active search task, and is used with sorting logic 710 to sort detected peaks delivered from peak detector 470, and for delivering sorted peaks to a destination, such as DSP 340.

Figure 8:
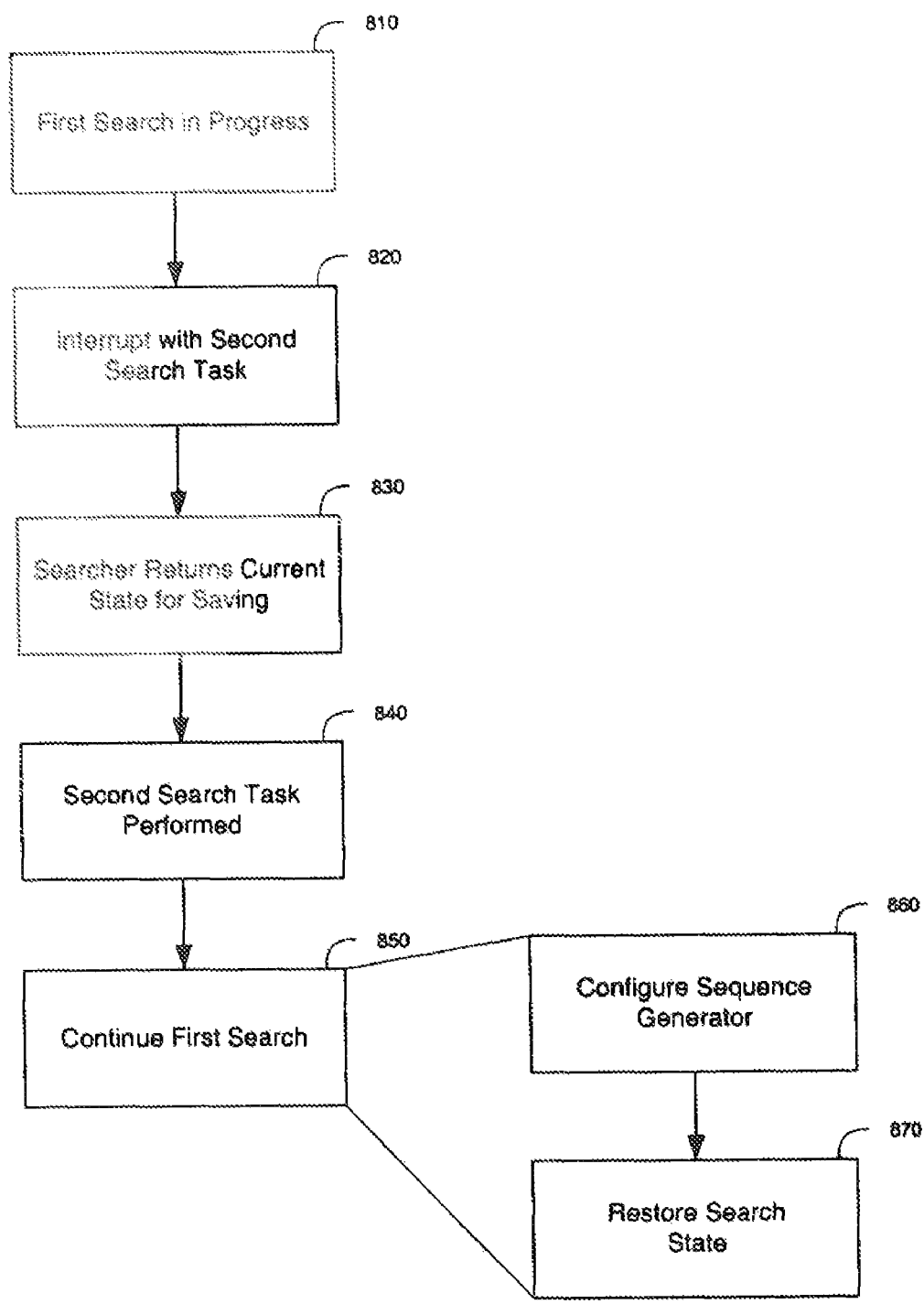
FIG. 8 depicts a flowchart of an embodiment of a method of performing segmented CDMA searching.

FIG. 8 depicts a flowchart of an embodiment of a method for performing segmented CDMA search. A first search is in progress in step 810. Proceed to step 820, where the first search is interrupted with a second search request. Proceed to step 830, where the searcher 330 returns its current state and partial results for storing. This step can be carried out in a variety of ways, including delivering the state and results from the various searcher blocks to the DSP for storing in internal or attached memory. Alternatively, the results and state can be stored in various parallel banks, as described above with respect to FIGS. 5-7.

Proceed to step 840, where the second search task is performed. Upon completion, or if the time allotted to the second search has expired, proceed to step 850 to continue the interrupted first search. Note that the second search may be interrupted by the first search (or an intervening third search, etc.), and the results can be stored for that search as well, storage size permitting. In one embodiment, step 850 can be further detailed as shown in steps 860 and 870. In step 860, the sequence generator, such as sequence generator 430, is configured for the first search. In step 870, the first search state and partial results, if applicable, are restored. The restoration can take place by recalling from memory and delivery by the DSP to the various blocks, as described above with respect to FIG. 4, or by switching to the appropriate storage banks, as described above with respect to FIGS. 5-8.

Figure 9:
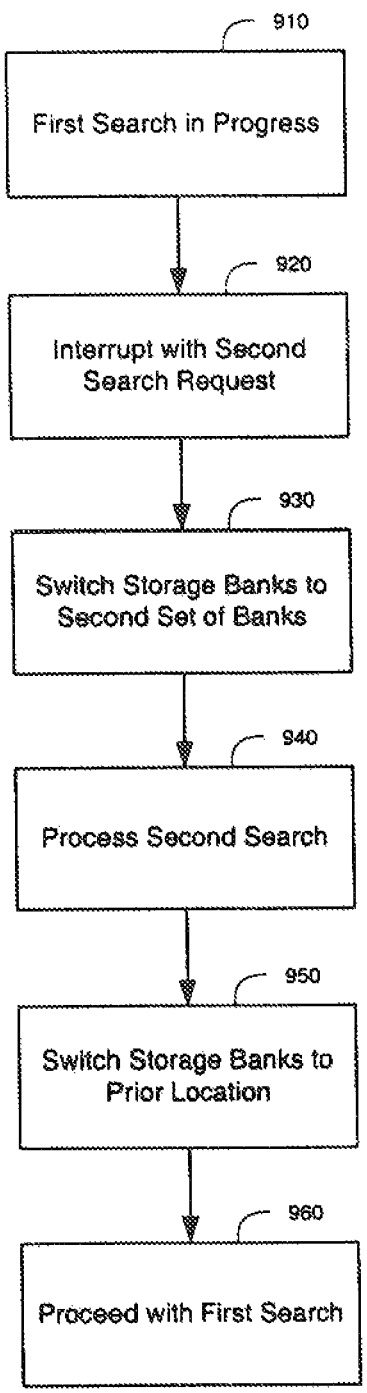
FIG. 9 depicts a flowchart of an alternate embodiment of a method of performing segmented CDMA searching.

FIG. 9 depicts a flowchart of an alternate embodiment of a method for performing segmented CDMA search. A first search is in progress in step 910. Proceed to step 920, where the first search is interrupted with a second search request. Proceed to step 930, to switch storage banks from those used by the first search to an alternate set of storage banks. Proceed to step 940, where the second search task is performed. Upon completion, or if the time allotted to the second search has expired, proceed to step 950 to switch the storage banks back to the prior location, used for the first search task. Proceed to step 960, and continue the interrupted first search. In some embodiments, the sequence generator may need to be reconfigured for continuing the first search. Note that, before, the second search may be interrupted by the first search (or an intervening third search, etc.). Storage size permitting, the second search can be suspended by leaving its state and partial results in the second storage bank, and switching to the next bank.

Figure 10:
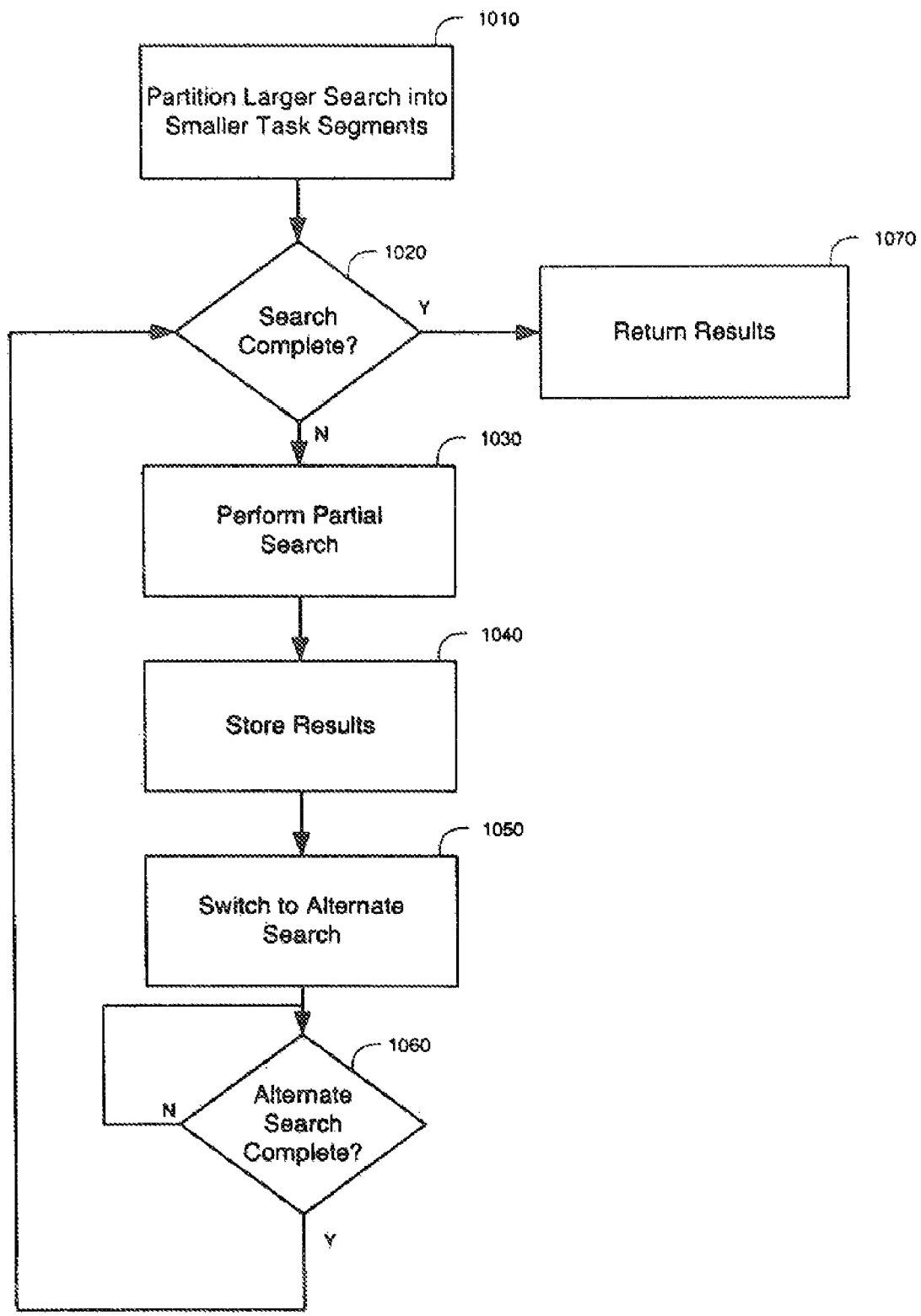
FIG. 10 depicts a flowchart of an embodiment of a method of segmenting a search task.

FIG. 10 depicts a flowchart of an embodiment of a method for performing a search task segmented into smaller search tasks. This technique is useful when the time available for search on a particular system or frequency is known in advance, and that time is smaller than the time required to perform a complete search task. One example where this technique is useful is in searching during compressed mode gaps, defined in the W-CDMA standard. In the W-CDMA standard, the network can direct a mobile station to search in alternate frequencies during specific gaps in the frame, in which no transmission occurs on the primary frequency. During these gaps, the mobile station can tune to a new frequency and search for neighboring base stations on any one of the supported CDMA systems.

In step 1010, partition the larger search into smaller search tasks, each of which will fit within one of the contiguous times allotted to the search task. Proceed to decision block 1020, to determine if the search task is complete. Since it has just begun, proceed to step 1030, and perform a partial search task. Store the results in step 1040. Switch to an alternate search in step 1050. Proceed to decision block 1060 to wait until the alternate search is complete. If not, loop back to decision block 1060. (Note that, as described previously, the alternate search may be one segment of a larger search, and the alternate search may be interruptible.) Once complete, proceed back to decision block 1020, to process the next search segment. Proceed to block 1030 to perform the partial search. The partial results and state from the previous search segment can be restored in the searcher. Continue on with steps 1040 through 1060, as described above. Note that the storing and restoring of state and partial results can be carried out using bank-switching techniques, as described, or by delivering the results to and retrieving results from another memory, such as one attached to a DSP. After the final search segment has been processed, then, upon returning to decision block 1030, the search is complete. Proceed to step 1070 to return the completed search results.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessor in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A single searcher, for performing a plurality of segmentable search tasks, comprising:
a plurality of storage elements, selectable for performing the plurality of search tasks, each storage element operable for storage of and access to state information for one of the plurality of search tasks, wherein the plurality of search tasks are segments of ongoing multiple searches for different systems and each of the plurality of search tasks may be interrupted by another of the plurality of search tasks, and wherein the interrupted search task is later restored from storage and completed by combining the results of one or more search segments.

2. The searcher of claim 1, further comprising a non-coherent accumulator, partial accumulations from which are stored in ones of the plurality of storage elements, selectable for performing the plurality of search tasks, corresponding to ones of the plurality of search tasks.

3. The searcher of claim 1, further comprising a coherent accumulator, partial accumulations from which are stored in ones of the plurality of storage elements, selectable for performing the plurality of search tasks, corresponding to ones of the plurality of search tasks.

4. The searcher of claim 1, further comprising a peak detector, peak detector state information for which is stored in ones of the plurality of storage elements, selectable for performing the plurality of search tasks, corresponding to ones of the plurality of search tasks.

5. The searcher of claim 1, further comprising a sorter, sorting information for which is stored in ones of the plurality of storage elements, selectable for performing the plurality of search tasks, corresponding to ones of the plurality of search tasks.

6. The searcher of claim 1, further comprising a processor connected to the plurality of storage elements, selectable for performing the plurality of search tasks, operable to load and retrieve state information therefrom.

7. The searcher of claim 1, wherein the plurality of storage elements, selectable for performing the plurality of search tasks, are located in one random access memory (RAM).

8. The searcher of claim 1, wherein the plurality of storage elements, selectable for performing the plurality of search tasks, are located in banks of registers.

9. The method of claim 1, wherein the plurality of storage elements, selectable for performing the plurality of search tasks, are located in banks of registers.

10. A mobile station, including a searcher for performing a plurality of segmentable search tasks, comprising:
a plurality of storage elements, selectable for performing the plurality of search tasks, each storage element operable for storage of and access to state information for one of the plurality of search tasks, wherein the plurality of search tasks are segments of ongoing multiple searches for different systems and each of the plurality of search tasks may be interrupted by another of the plurality of search tasks, and wherein the interrupted search task is later restored from storage and completed by combining the results of one or more search segments.

11. A wireless communication system, including a mobile station configured for performing a plurality of segmentable search tasks in a single searcher, comprising:
a plurality of storage elements, selectable for performing the plurality of search tasks, each storage element operable for storage of and access to state information for one of the plurality of search tasks, wherein the plurality of search tasks are segments of ongoing multiple searches for different systems and each of the plurality of search tasks may be interrupted by another of the plurality of search tasks, and wherein the interrupted search task is later restored from storage and completed by combining the results of one or more search segments.

12. A method of segmenting a plurality of search tasks for processing with a single searcher, operable with a plurality of storage elements, selectable for performing the plurality of search tasks, corresponding to the plurality of search tasks, comprising:
partitioning a first search task into a plurality of search segments, the length of time to process each segment being less than or equal to a contiguous segment of time allotted within the searcher for processing the first search task;
performing each of the plurality of search segments, storing the results in a first one of the plurality of storage elements; and
performing a plurality of alternate search tasks, selecting ones of the remainder of the plurality of storage elements for processing therewith, the alternate search tasks being processed in time periods between the processing of ones of the plurality of search segments of the first search task.

13. Processor readable media, operable for segmenting a plurality of search tasks for processing with a single searcher, configured with a plurality of storage elements, selectable for performing the plurality of search tasks, corresponding to the plurality of search tasks, the media operable to perform the steps of:
partitioning a first search task into a plurality of search segments, the length of time to process each segment being less than or equal to a contiguous segment of time allotted within the searcher for processing the first search task;
performing each of the plurality of search segments, storing the results in a first one of the plurality of storage elements; and
performing a plurality of alternate search tasks, selecting ones of the remainder of the plurality of storage elements for processing therewith, the alternate search tasks being processed in time periods between the processing of ones of the plurality of search segments of the first search task.

14. An apparatus for segmenting a plurality of search tasks for processing with a single searcher, operable with a plurality of storage elements, selectable for performing the plurality of search tasks, corresponding to the plurality of search tasks, comprising:
means for partitioning a first search task into a plurality of search segments, the length of time to process each segment being less than or equal to a contiguous segment of time allotted within the searcher for processing the first search task;
means for performing each of the plurality of search segments, storing the results in a first one of the plurality of storage elements; and
means for performing a plurality of alternate search tasks, selecting ones of the remainder of the plurality of storage elements for processing therewith, the alternate search tasks being processed in time periods between the processing of ones of the plurality of search segments of the first search task.

15. A method of performing a plurality of segmentable search tasks in a single searcher, comprising:
interrupting a first search task in progress;
storing state information for the first search task;
performing a second search task;
accessing state information for the first search task; and
continuing the first search task using the stored state information, wherein the first and second search tasks are segments of ongoing multiple searches for different systems and the first and second search tasks may be interrupted by each other, and wherein the interrupted search task is later restored from storage and completed by combining the results of one or more search segments.

16. The method of claim 15, further comprising generating partial search information using a non-coherent accumulator and storing the accumulated partial search information in one of a plurality of storage elements selectable for performing the plurality of search tasks, corresponding to ones of the plurality of search tasks.

17. The method of claim 15, further comprising generating partial search information using a coherent accumulator and storing the accumulated partial search information in one of a plurality of storage elements, selectable for performing the plurality of search tasks, corresponding to ones of the plurality of search tasks.

18. The method of claim 15, further comprising generating peak detector state information using a peak detector, which is stored in one of the plurality of storage elements, selectable for performing the plurality of search tasks, corresponding to one of the plurality of search tasks.

19. The method of claim 15, further comprising sorting information stored in one of the plurality of storage elements, selectable for performing the plurality of search tasks, corresponding to ones of the plurality of search tasks.

20. The method of claim 15, further comprising retrieving state information from one of the plurality of storage elements, selectable for performing the plurality of search tasks, in order to continue an interrupted search corresponding to the storage element.

21. The method of claim 15, wherein the plurality of storage elements, selectable for performing the plurality of search tasks, are located in one random access memory (RAM).

* * * * *